United States Patent
Markosyan

(10) Patent No.: US 11,647,773 B2
(45) Date of Patent: May 16, 2023

(54) PRODUCTION METHODS FOR STEVIOL GLYCOSIDES COMPOSITIONS

(71) Applicant: PURECIRCLE USA INC., Westchester, IL (US)

(72) Inventor: Avetik Markosyan, Kuala Lumpur (MY)

(73) Assignee: PURECIRCLE USA INC., Westchester, IL (US)

(*) Notice: Subject to any disclaimer, the term of this patent is extended or adjusted under 35 U.S.C. 154(b) by 0 days.

(21) Appl. No.: 17/550,485

(22) Filed: Dec. 14, 2021

(65) Prior Publication Data

US 2022/0095658 A1 Mar. 31, 2022

Related U.S. Application Data

(63) Continuation of application No. 16/310,141, filed as application No. PCT/US2017/028138 on Apr. 18, 2017, now Pat. No. 11,229,229.

(60) Provisional application No. 62/349,760, filed on Jun. 14, 2016.

(51) Int. Cl.
*A23L 27/30* (2016.01)
*A23L 2/60* (2006.01)
*A23P 10/40* (2016.01)

(52) U.S. Cl.
CPC .............. *A23L 27/36* (2016.08); *A23L 2/60* (2013.01); *A23L 27/30* (2016.08); *A23P 10/40* (2016.08); *A23V 2002/00* (2013.01); *A23V 2250/258* (2013.01); *A23V 2250/262* (2013.01); *A23V 2300/40* (2013.01)

(58) Field of Classification Search
CPC .. A23L 27/30; A23L 27/36; A23L 2/60; A23P 10/40; A23V 2002/00; A23V 2250/258; A23V 2250/262; A23V 2300/40
See application file for complete search history.

(56) References Cited

U.S. PATENT DOCUMENTS

| | | | |
|---|---|---|---|
| 7,923,552 B2 | 4/2011 | Jackson et al. | |
| 9,107,436 B2 | 8/2015 | Purkayastha et al. | |
| 9,427,006 B2 | 8/2016 | Markosyan | |
| 10,005,824 B2 | 6/2018 | Oestergaard et al. | |
| 10,176,184 B2 | 1/2019 | Lee et al. | |
| 10,905,146 B2 | 2/2021 | Prakash et al. | |
| 11,229,229 B2 * | 1/2022 | Markosyan | A23L 27/30 |
| 2006/0083838 A1 | 4/2006 | Jackson et al. | |
| 2007/0292582 A1 | 12/2007 | Prakash et al. | |
| 2008/0292764 A1 | 11/2008 | Prakash et al. | |
| 2011/0287164 A1 | 11/2011 | Markosyan | |
| 2013/0330463 A1 | 12/2013 | Markosyan | |
| 2014/0179804 A1 | 6/2014 | Markosyan | |
| 2015/0017284 A1 | 1/2015 | Prakash | |
| 2015/0223505 A1 | 8/2015 | Markosyan | |
| 2016/0338396 A1 | 11/2016 | Wang | |
| 2017/0064988 A1 | 3/2017 | Prakash et al. | |
| 2018/0049455 A1 | 2/2018 | Morita | |
| 2018/0371002 A1 | 12/2018 | Zhu et al. | |

FOREIGN PATENT DOCUMENTS

| | | |
|---|---|---|
| JP | 2009541334 A | 11/2009 |
| JP | 2010528029 A | 8/2010 |
| JP | 2017504880 A | 2/2017 |
| JP | 2018522843 A | 8/2018 |
| RU | 2483584 | 6/2013 |
| WO | 2012177727 A1 | 12/2012 |
| WO | 2014100410 A1 | 6/2014 |
| WO | 2016143361 A1 | 9/2016 |
| WO | 2017012572 A1 | 1/2017 |
| WO | 2017160846 A1 | 9/2021 |

OTHER PUBLICATIONS

What is Ambient Temperature. 2019. https://www.techtarget.com/searchdatacenter/definition/ambient-temperature#:~:text=Ambient%20temperature%20is%20the%20air,system%20design%20and%20thermal%20analysis.*
Alternative Sweeteners. Editor O'Brian Nabors. 2012. pp. 163-164.
American Heritage Dictionary: Room Temperature, 2020, https://www.ahdictionary.com/word/search.html?q=room+temperature.
Indra Prakash, Avetik Markosyan, Cynthia Bunders, "Development of Next Generation Stevia Sweetener: Rebaudioside M", Foods, (2014), vol. 3, pp. 162-175, XP002796837 DOI: http://dx.doi.org/10.3390/foods3010162.

* cited by examiner

*Primary Examiner* — Anthony J Weier
(74) *Attorney, Agent, or Firm* — Richard Casey

(57) ABSTRACT

Steviol glycosides compositions are prepared from *Stevia rebaudiana* extracts. The compositions are able to provide a superior taste profile and can be used as sweeteners, sweetness enhancers, flavors, and flavor enhancers in foods, beverages, cosmetics and pharmaceuticals.

6 Claims, No Drawings

PRODUCTION METHODS FOR STEVIOL GLYCOSIDES COMPOSITIONS

This application is a continuation of application Ser. No. 16/310,141, filed on Dec. 14, 2018, now U.S. Pat. No, 11,229,229, was filed as a national-stage entry of application No. PCT/US17/28138 on Apr. 18, 2017, and claims priority from Provisional application No. 62/349,760, filed Jun. 14, 2016.

BACKGROUND OF THE INVENTION

Field of the Invention

The invention relates to a process for producing purified food ingredients from the *Stevia rebaudiana* plant and their use in various food products and beverages.

Description of the Related Art

Nowadays sugar alternatives are receiving increasing attention due to awareness of many diseases in conjunction with consumption of high-sugar foods and beverages. However many artificial sweeteners such as dulcin, sodium cyclamate and saccharin were banned or restricted in some countries due to concerns on their safety. Therefore non-caloric sweeteners of natural origin are becoming increasingly popular. The sweet herb *Stevia rebaudiana* Bertoni produces a number of diterpene glycosides which feature high intensity sweetness and sensory properties superior to those of many other high potency sweeteners.

The above-mentioned sweet glycosides have a common aglycon, steviol, and differ by the number and type of carbohydrate residues at the C13 and C19 positions. The leaves of *Stevia* are able to accumulate up to 10-20% (on dry weight basis) steviol glycosides. The major glycosides found in *Stevia* leaves are rebaudioside A (2-10%), stevioside (2-10%), and rebaudioside C (1-2%). Other steviol glycosides such as rebaudiosides B, D, E, F, G, H, I, J, K, L, M, N, and O, steviolbioside, rubusoside, etc., are also found at low levels.

Steviol glycosides differ from each other not only by molecular structure, but also by their taste properties. Usually stevioside is found to be 110-270 times sweeter than sucrose, rebaudioside A between 150 and 320 times, and rebaudioside C between 40-60 times sweeter than sucrose. Dulcoside A is 30 times sweeter than sucrose.

Many steviol glycosides are known to have low solubility in purified form.

Methods for the extraction and purification of sweet glycosides from the *Stevia rebaudiana* plant using water or organic solvents are described in, for example, U.S. Pat. Nos. 4,361,697; 4,082,858; 4,892,938; 5,972,120; 5,962,678; 7,838,044 and 7,862,845.

This invention provides an alternative, more efficient method, not described in the prior art, for steviol glycosides purification.

SUMMARY OF THE INVENTION

In one embodiment, the present invention is directed to a process for producing a steviol glycosides composition, including: providing a starting material comprising at least one steviol glycoside of *Stevia rebaudiana* plant; dissolving the starting material in aqueous alcohol to obtain a solution of starting material; holding the solution of starting material at a temperature ranging from about −24° C. to about 80° C. during a time interval ranging from about 1 minute to about 240 hours, to obtain a crystallized steviol glycosides composition; separating the crystallized steviol glycosides composition from the mother liquor to obtain a separated steviol glycosides composition; and drying the separated steviol glycosides composition to yield the steviol glycosides composition. In one embodiment, the steviol glycosides composition prepared by this method has a solubility of at least 0.01% in water at 20° C.

The steviol glycosides composition prepared by the above method may be used as, or included in, a sweetener composition or a flavor composition. The steviol glycosides composition may also be used as a food ingredient, or may be included in foods, beverages, cosmetics, or pharmaceutical products.

DETAILED DESCRIPTION OF THE INVENTION

The present invention is aimed to overcome the disadvantages of existing steviol glycosides purification processes.

The invention, in part, pertains to a process for producing a steviol glycosides composition comprising at least one steviol glycoside of *Stevia rebaudiana* plant selected from the group consisting of stevioside, rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, dulcoside A, steviolbioside, and rubusoside, as well as other steviol glycosides found in *Stevia rebaudiana* plant and mixtures thereof.

In one embodiment the Rebaudioside A content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside B content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside C content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside D content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, ii %, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside E content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside F content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside G content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside H content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside/content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside J content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside K content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside L content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside M content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside N content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rebaudioside O content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Stevioside content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Dulcoside A content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Rubusoside content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the Steviolbioside content (% w/w, on dried basis) in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

In another embodiment the content (% w/w, on dried basis) of any Steviol Glycoside found in *Stevia rebaudiana* in a steviol glycosides composition produced according to the claimed invention is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, ii %, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%.

The starting material used in the process comprises at least one steviol glycoside of *Stevia rebaudiana* plant selected from the group consisting of stevioside, rebaudioside A, rebaudioside B, rebaudioside C, rebaudioside D, rebaudioside E, rebaudioside A, rebaudioside G, rebaudioside H, rebaudioside I, rebaudioside J, rebaudioside K, rebaudioside L, rebaudioside M, rebaudioside N, rebaudioside O, dulcoside A, steviolbioside, and rubusoside, as well as other steviol glycosides found in *Stevia rebaudiana* plant and mixtures thereof.

In one embodiment the Rebaudioside A content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside B content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside C content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside D content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside E content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside F content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, K) 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside G content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside H content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside I content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside J content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside K content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside L content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside M content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside N content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rebaudioside O content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Stevioside content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Dulcoside A content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Rubusoside content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the Steviolbioside content (% w/w, on dried basis) in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

In another embodiment the content (% w/w, on dried basis) of any Steviol Glycoside found in *Stevia rebaudiana* in a starting material is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, ii %, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99%.

The starting material is mixed with aqueous alcohol and optionally heated to a temperature ranging from about 25° C. to about 100° C. to obtain a solution of starting material.

In one embodiment the aqueous alcohol comprises (% v/v) about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 99.9% Ethyl alcohol (Ethanol).

The concentration (% w/v) of starting material in the obtained solution is about 0.05%, 0.1%, 0.2%, 0.3%, 0.4%, 0.5%, 0.6%, 0.7%, 0.8%, 0.9%, 1%, 1.5%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, or 70%.

In one embodiment the solution of starting material is held at a temperature ranging from about −24° C. to about 80° C. during a time interval ranging from about 1 minute to about 240 hours.

In one embodiment the solution of starting material is optionally seeded with a steviol glycosides seed composition to promote crystallization of the steviol glycosides composition.

The steviol glycosides seed composition comprises at least one steviol glycoside of *Stevia rebaudiana* plant selected from the group consisting of stevioside, rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, dulcoside A, steviolbioside, and rubusoside, as well as other steviol glycosides found in *Stevia rebaudiana* plant and mixtures thereof.

In one embodiment the solution of starting material is held at about −24° C., −23° C., −22° C., −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 67° C., 68° C., 69° C., 70° C., 71° C., 72° C., 73° C., 74° C., 75° C., 76° C., 77° C., 78° C., 79° C., or 80° C. during a time interval ranging from about 1 minute to about 240 hours.

In one embodiment the solution of starting material is held at a temperature ranging from about −24° C. to about 80° C. during a time interval of about 1 min, 2 min, 3 min, 4 min, 5 min, 6 min, 7 min, 8 min, 9 min, 10 min, 11 min, 12 min, 13 min, 14 min, 15 min, 16 min, 17 min, 18 min, 19 min, 20 min, 21 min, 22 min, 23 min, 24 min, 25 min, 26 min, 27 min, 28 min, 29 min, 30 min, 31 min, 32 min, 33 min, 34 min, 35 min, 36 min, 37 min, 38 min, 39 min, 40 min, 41 min, 42 min, 43 min, 44 min, 45 min, 46 min, 47 min, 48 min, 49 min, 50 min, 51 min, 52 min, 53 min, 54 min, 55 min, 56 min, 57 min, 58 min, 59 min, or 60 min.

In one embodiment the solution of starting material is held at the temperature ranging from about −24° C. to about 80° C. during a time interval of about 1 hr, 2 hrs, 3 hrs, 4 hrs, 5 hrs, 6 hrs, 7 hrs, 8 hrs, 9 hrs, 10 hrs, 11 hrs, 12 hrs, 13 hrs, 14 hrs, 15 hrs, 16 hrs, 17 hrs, 18 hrs, 19 hrs, 20 hrs, 21 hrs, 22 hrs, 23 hrs, 24 hrs, 25 hrs, 26 hrs, 27 hrs, 28 hrs, 29 hrs, 30 hrs, 31 hrs, 32 hrs, 33 hrs, 34 hrs, 35 hrs, 36 hrs, 37 hrs, 38 hrs, 39 hrs, 40 hrs, 41 hrs, 42 hrs, 43 hrs, 44 hrs, 45 hrs, 46 hrs, 47 hrs, 48 hrs, 49 hrs, 50 hrs, 51 hrs, 52 hrs, 53 hrs, 54 hrs, 55 hrs, 56 hrs, 57 hrs, 58 hrs, 59 hrs, 60 hrs, 61 hrs, 62 hrs, 63 hrs, 64 hrs, 65 hrs, 66 hrs, 67 hrs, 68 hrs, 69 hrs, 70 hrs, 71 hrs, 72 hrs, 73 hrs, 74 hrs, 75 hrs, 76 hrs, 77 hrs, 78 hrs, 79 hrs, 80 hrs, 81 hrs, 82 hrs, 83 hrs, 84 hrs, 85 hrs, 86 hrs, 87 hrs, 88 hrs, 89 hrs, 90 hrs, 91 hrs, 92 hrs, 93 hrs, 94 hrs, 95 hrs, 96 hrs, 97 hrs, 98 hrs, 99 hrs, 100 hrs, 101 hrs, 102 hrs, 103 hrs, 104 hrs, 105 hrs, 106 hrs, 107 hrs, 108 hrs, 109 hrs, 110 hrs, 111 hrs, 112 hrs, 113 hrs, 114 hrs, 115 hrs, 116 hrs, 117 hrs, 118 hrs, 119 hrs, 120 hrs, 121 hrs, 122 hrs, 123 hrs, 124 hrs, 125 hrs, 126 hrs, 127 hrs, 128 hrs, 129 hrs, 130 hrs, 131 hrs, 132 hrs, 133 hrs, 134 hrs, 135 hrs, 136 hrs, 137 hrs, 138 hrs, 139 hrs, 140 hrs, 141 hrs, 142 hrs, 143 hrs, 144 hrs, 145 hrs, 146 hrs, 147 hrs, 148 hrs, 149 hrs, 150 hrs, 151 hrs, 152 hrs, 153 hrs, 154 hrs, 155 hrs, 156 hrs, 157 hrs, 158 hrs, 159 hrs, 160 hrs, 161 hrs, 162 hrs, 163 hrs, 164 hrs, 165 hrs, 166 hrs, 167 hrs, 168 hrs, 169 hrs, 170 hrs, 171 hrs, 172 hrs, 173 hrs, 174 hrs, 175 hrs, 176 hrs, 111 hrs, 178 hrs, 179 hrs, 180 hrs, 181 hrs, 182 hrs, 183 hrs, 184 hrs, 185 hrs, 186 hrs, 187 hrs, 188 hrs, 189 hrs, 190 hrs, 191 hrs, 192 hrs, 193 hrs, 194 hrs, 195 hrs, 196 hrs, 197 hrs, 198 hrs, 199 hrs, 200 hrs, 201 hrs, 202 hrs, 203 hrs, 204 hrs, 205 hrs, 206 hrs, 207 hrs, 208 hrs, 209 hrs, 210 hrs, 211 hrs, 212 hrs, 213 hrs, 214 hrs, 215 hrs, 216 hrs, 217 hrs, 218 hrs, 219 hrs, 220 hrs, 221 hrs, 222 hrs, 223 hrs, 224 hrs, 225 hrs, 226 hrs, 227 hrs, 228 hrs, 229 hrs, 230 hrs, 231 hrs, 232 hrs, 233 hrs, 234 hrs, 235 hrs, 236 hrs, 237 hrs, 238 hrs, 239 hrs, or 240 hrs.

In one embodiment the steviol glycosides composition crystallized from a solution of starting material is separated from the mother liquor (liquid phase) and dried to yield a powdered steviol glycosides composition containing less than 6% moisture. The moisture is determined by a "loss on drying" method at 105° C. during 2 hrs (JECFA void).

The obtained steviol glycosides composition water solubility (% w/v) is determined by dissolving the powdered steviol glycosides composition in 20° C. deionized water. The material is deemed soluble if it completely dissolves within 10 min of agitation and produces a clear solution (<10 FAU) stable for 24 hrs.

In one embodiment the powdered steviol glycosides composition water solubility (% w/v) is not less than about 0.01%, 0.02%, 0.03%, 0.04%, 0.05%, 0.06%, 0.07%, 0.08%, 0.09%, 0.10%, 0.2%, 0.3%, 0.4%, 0.5%, 0.6%, 0.7%, 0.8%, 0.9%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 40.0%, 40.1%, 40.2%, 40.3%, 4.4%, 40.5%, 40.6%, 40.7%, 40.8%, 40.9%, 5.0%, 5.5%, 6.0%, 6.5%, 7.0%, 7.5%, 8.0%, 8.5%, 9.0%, 9.5%, or 10.0%.

The steviol glycosides compositions of the present invention can be used as sweeteners, sweetness enhancers, flavors and flavor enhancers in various food and beverage products. Non-limiting examples of food and beverage products include carbonated soft drinks, including but not limited to cola flavored carbonated soft drinks, Suit flavored carbonated soft drinks, berry flavored carbonated soft drinks, ready to drink beverages, energy drinks, isotonic drinks, low-caloric drinks, zero-caloric drinks, sports drinks, teas, Suit and vegetable juices, juice drinks, dairy drinks, yoghurt drinks, alcohol beverages, powdered beverages, bakery products, cookies, biscuits, baking mixes, cereals, confectioneries, candies, toffees, chewing gum, dairy products, flavored milk, yoghurts, flavored yoghurts, cultured milk, soy sauce and other soy base products, salad dressings, mayonnaise, vinegar, frozen-desserts, meat products, fish-meat products, bottled and canned foods, tabletop sweeteners, and fruits and vegetables.

Additionally the steviol glycosides compositions of the present invention can be used in drug or pharmaceutical preparations and cosmetics, including but not limited to toothpaste, mouthwash, cough syrup, chewable tablets, lozenges, vitamin preparations, and the like.

The steviol glycosides compositions of the present invention can be used "as-is" or in combination with other sweeteners, flavors and food ingredients.

Non-limiting examples of sweeteners include rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, dulcoside A, steviolbioside, rubusoside, as web as other steviol glycosides found in *Stevia rebaudiana* plant and mixtures thereof, *stevia* extracts, glycosylated steviol glycosides, steviol glycosides prepared by chemical, enzymatic synthesis or by fermentation of recombinant microorganisms, Luo Han Guo extract, mogrosides, glycosylated mogrosides, high-fructose corn syrup, corn syrup, invert sugar, fructooligosaccharides, inulin, inulooligosaccharides, coupling sugar, maltooligosaccharides, maltodextrins, dextrins, limited dextrins, corn syrup solids, glucose, maltose, sucrose, lactose, allulose, tagatose, aspartame, saccharin, sucralose, sugar alcohols and mixtures thereof.

Non-limiting examples of flavors include cola, lemon, lime, orange, grapefruit, banana, grape, apple, pear, pineapple, bitter almond, cinnamon, sugar, cotton candy, vanilla flavors, glycosylated steviol glycosides, NSF02 and mixtures thereof.

Non-limiting examples of other food ingredients include flavors, acidulants, organic and amino acids, coloring agents, bulking agents, modified starches, gums, texturizers, preservatives, antioxidants, vitamins, emulsifiers, stabilisers, thickeners, gelling agents, caffeine, theanine, theobromine and mixtures thereof.

The following examples illustrate some embodiments of the invention. It will be understood that the invention is not limited to the materials, proportions, conditions and procedures set forth in the examples, which are only illustrative.

EXAMPLE 1

Preparation of Steviol Glycosides Composition 14 kg of starting *stevia* extract (SSE; Lot #C4-0001-1015-0011) manufactured by PureCircle Sdn Bhd (Malaysia) was added into 112 liters of 75% (v/v) Ethanol. The mixture was heated to 80° C. for complete dissolution of SSE. Then solution temperature was reduced to 25° C. and about 3 g of crystalline Rebaudioside M was added as seed. The solution was held at 25° C. for 96 hrs for crystallization. The obtained crystals were separated from the mother liquor and washed with pure Ethanol in a basket centrifuge. The wet crystals were dried in a vacuum drier (70° C.). About 4 kg of powdered steviol glycosides composition (SGC-1) was obtained. The solubility of obtained composition in 20° C. deionized water was 0.05% (w/v).

Both SSE and steviol glycosides composition (SGC-1) were analyzed by the following HPLC method.

HPLC system: Agilent 1200 series system equipped with binary pump, auto sampler, column oven and DAD detector Column: Poroshell 120 SB-C18, 4.6×150 mm, 2.7 µm at 40° C.

Mobile Phase:

Premix 1: 75% (v/v) 10 mmol/L (pH 2.6) phosphate buffer in acetonitrile

Premix 2: 68% (v/v) 10 mmol/L (pH 2.6) phosphate buffer in acetonitrile

Gradient Program:

| Time (min) | Premix 1 (%) | Premix 2 (%) |
|---|---|---|
| 0.0 | 100 | 0 |
| 12.0 | 100 | 0 |
| 12.5 | 50 | 50 |
| 13.0 | 0 | 100 |
| 40.0 | 0 | 100 |

Flow rate: 1.0 mL/min

Injection volume: 5 µL

Detector: UV 210 nm

Run time: 40 minutes

Sample: approx. 1,200 mg/L in diluent (70% (v/v) water in acetonitrile)

The HPLC assay results are provided in Table 1.

TABLE 1

HPLC assay results of SSE and SGC-1

| Steviol Glycoside | HPLC assay (% w/w, dried basis) | |
|---|---|---|
|  | SSE | SGC-1 |
| Reb E | 3.42 | 0.84 |
| Reb O | 7.34 | 1.07 |
| Reb D | 25.26 | 67.34 |
| Reb N | 7.26 | 2.3 |
| Reb M | 10.71 | 22.58 |
| Reb A | 11.19 | 1.44 |
| Stev | 1.67 | 0.02 |
| Reb F | 0.08 | ND |
| Reb C | 0.41 | ND |
| Dul A | 0.1 | ND |
| Rub | ND | ND |
| Reb B | 0.29 | 0.16 |
| Sbio | 0.03 | ND |

EXAMPLE 2

Preparation of Steviol Glycosides Composition 14 kg of starting *stevia* extract (SSE; Lot #C4-0001-1015-0011) manufactured by PureCircle Sdn Bhd (Malaysia) was added into 112 liters of 75% (v/v) Ethanol. The mixture was heated to 80° C. for complete dissolution of SSE. Then solution temperature was reduced to 25° C. and it was held at 25° C. for 144 hrs for crystallization. No crystalline Rebaudioside M seeds were added, so the crystallization was slower compared to EXAMPLE 1. The obtained crystals were separated from the mother liquor and washed with pure Ethanol in a basket centrifuge. The wet crystals were dried in a vacuum drier (70° C.). About 3.8 kg of powdered steviol glycosides composition (SGC-2) was obtained with 1.5% (w/w) moisture content and 0.16% (w/w) residual Ethanol content. The solubility of SGC-2 sample in 20° C. deionized water was 0.5% (w/v) i.e. about 10 times higher than the solubility of SGC-1 of EXAMPLE 1.

Both SSE and SGC-2 were analyzed using the HPLC method described in EXAMPLE 1. The HPLC assay results are provided in Table 2.

TABLE 2

HPLC assay results of SSE and SGC-2

| Steviol Glycoside | HPLC assay (% w/w, dried basis) | |
| --- | --- | --- |
| | SSE | SGC-2 |
| Reb E | 3.42 | 0.83 |
| Reb O | 7.34 | 1.03 |
| Reb D | 25.26 | 67.5 |
| Reb N | 7.26 | 2.27 |
| Reb M | 10.71 | 22.62 |
| Reb A | 11.19 | 1.41 |
| Stev | 1.67 | 0.02 |
| Reb F | 0.08 | ND |
| Reb C | 0.41 | ND |
| Dul A | 0.1 | ND |
| Rub | ND | ND |
| Reb B | 0.29 | 0.15 |
| Sbio | 0.03 | ND |

Both starting *stevia* extract (SSE) and the obtained steviol glycosides composition (SGC-2) were used in the following taste evaluation experiments.

EXAMPLE 3

Low-Calorie Orange Juice Drink

Orange concentrate (35%), citric acid (0.35%), ascorbic acid (0.05%), orange red color (0.01%), orange flavor (0.20%), and 0.05% starting *stevia* extract (SSE) or steviol glycosides composition (SGC-2) of EXAMPLE 2, were blended and dissolved completely in water (up to 100%) and pasteurized.

The sensory evaluations of the samples are summarized in Table 3. The data shows that the best results can be obtained by using the steviol glycosides composition obtained according to EXAMPLE 2. Particularly the drinks prepared with said composition exhibited a rounded and complete flavor profile and mouthfeel.

TABLE 3

Evaluation of orange juice drink samples

| | Number of panelists detected the attribute | |
| --- | --- | --- |
| Taste attribute | SSE | SGC-2 |
| Bitterness | 16 | 0 |
| Astringency | 15 | 0 |
| Aftertaste | 15 | 0 |
| Comments | | |
| Quality of taste | Bitter aftertaste (15 of 20) | Clean (20 of 20) |
| Overall evaluation | Satisfactory (3 of 20) | Satisfactory (20 of 20) |

The same method can be used to prepare juices and juice drinks from other fruits, such as apples, lemons, apricots, cherries, pineapples, mangoes, etc.

EXAMPLE 4

Zero-Calorie Carbonated Beverage

Carbonated beverage samples were prepared according to formulae presented in Table 4.

TABLE 4

Carbonated Beverage Formula

| | Quantity, % | |
| --- | --- | --- |
| Ingredients | SSE | SGC-2 |
| Cola flavor | 0.34 | 0.34 |
| ortho-Phosphoric acid | 0.1 | 0.1 |
| Sodium citrate | 0.31 | 0.31 |
| Sodium benzoate | 0.018 | 0.018 |
| Citric acid | 0.018 | 0.018 |
| Stevia | 0.05 | 0.05 |
| Carbonated water | to 100 | to 100 |

The sensory properties were evaluated by 20 panelists. The results are summarized in Table 5.

TABLE 5

Evaluation of zero-calorie carbonated beverage samples

| | Number of panelists detected the attribute | |
| --- | --- | --- |
| Taste attribute | SSE | SGC-2 |
| Bitterness | 17 | 0 |
| Astringency | 15 | 0 |
| Aftertaste | 16 | 1 |
| Comments | | |
| Quality of taste | Bitter aftertaste (16 of 20) | Clean (19 of 20) |
| Overall evaluation | Satisfactory (2 of 20) | Satisfactory (20 of 20) |

The above results show that the beverages prepared using the steviol glycosides composition obtained according to EXAMPLE 2 possessed better organoleptic characteristics.

EXAMPLE 5

Diet Cookies

Flour (50.0%), margarine (30.0%) fructose (10.0%), maltitol (8.0%), whole milk (1.0%), salt (0.2%), baking powder (0.15%), vanillin (0.1%) and starting *stevia* extract (SSE) or steviol glycosides composition (SGC-2) of EXAMPLE 2 (0.03%) were kneaded well in dough-mixing machine. The obtained dough was molded and baked in oven at 200° C. for 15 minutes.

The sensory properties were evaluated by 20 panelists. The best results were obtained in samples containing the steviol glycosides composition obtained according to EXAMPLE 2. The panelists noted a more rounded and complete flavor profile and mouthfeel.

EXAMPLE 6

Yoghurt

Starting *stevia* extract (SSE) or steviol glycosides composition (SGC-2) of EXAMPLE 2 (0.03%), and sucrose (4%) were dissolved in low fat milk. After pasteurizing at 82° C. for 20 minutes, the milk was cooled to 37° C. A starter culture (3%) was added and the mixture was incubated at 37° C. for 6 hours then at 5° C. for 12 hours.

The sensory properties were evaluated by 20 panelists. The best results were obtained in samples containing the steviol glycosides composition obtained according to EXAMPLE 2. The panelists noted a more rounded flavor profile and mouthfeel.

Although the invention and its advantages have been described in detail, it should be understood that various changes, substitutions and alterations can be made herein without departing from the spirit and scope of the invention as defined by the appended claims. Moreover, the scope of the application is not intended to be limited to the particular embodiments of the invention described in the specification. As one of ordinary skill in the art will readily appreciate from the disclosure of the invention, the compositions, processes, methods, and steps, presently existing or later to be developed that perform substantially the same function or achieve substantially the same result as the corresponding embodiments described herein may be utilized according to the invention.

I claim:

1. A process for producing a steviol glycosides composition, comprising the steps of:
 a) providing a *stevia* extract as a starting;
 b) providing aqueous alcohol;
 c) dissolving the starting material in the aqueous alcohol to obtain a solution of starting material;
 d) seeding the solution of starting material with a steviol glycoside seed composition;
 e) holding the solution of starting material at a temperature ranging from about −24° C. to about 80° C. during a time interval ranging from about 1 minute to about 240 hours, to obtain a crystallized steviol glycosides composition;
 f) separating the crystallized steviol glycosides composition from a mother liquor to obtain a separated steviol glycosides composition; and
 g) drying the separated steviol glycosides composition to yield the steviol glycosides composition,
 wherein the steviol glycosides composition has at least 0.01% solubility in 20° C. water.

2. The process of claim 1, wherein the steviol glycosides composition is a powdered steviol glycosides composition.

3. The method of claim 1, wherein the method additionally comprises after step g) and before step f) washing the separated steviol glycosides composition with pure alcohol in a basket centrifuge.

4. The method of claim 1, wherein in step g) the separated steviol glycosides composition is dried in a vacuum drier to yield a powdered steviol glycosides composition.

5. The method of claim 1, wherein in step b) the aqueous alcohol is 75% (v/v) ethanol.

6. The method of claim 1, wherein in step c) the starting material is dissolved in the aqueous alcohol at 80° C.

* * * * *

UNITED STATES PATENT AND TRADEMARK OFFICE
CERTIFICATE OF CORRECTION

PATENT NO. : 11,647,773 B2
APPLICATION NO. : 17/550485
DATED : May 16, 2023
INVENTOR(S) : Avetik Markosyan It is certified that error appears in the above-identified patent and that said Letters Patent is hereby corrected as shown below:

In the Claims

Column 17, Line 19 - Column 18, Line 12 Should read:
1. A process for producing a steviol glycosides composition, comprising the steps of:
a) providing a stevia extract as a starting material;
b) providing aqueous alcohol;
c) dissolving the starting material in the aqueous alcohol to obtain a solution of starting material;
d) seeding the solution of starting material with a steviol glycoside seed composition;
e) holding the solution of starting material at a temperature ranging from about –24° C. to about 80° C. during a time interval ranging from about 1 minute to about 240 hours, to obtain a crystallized steviol glycosides composition;
f) separating the crystallized steviol glycosides composition from a mother liquor to obtain a separated steviol glycosides composition; and
g) drying the separated steviol glycosides composition to yield the steviol glycosides composition, wherein the steviol glycosides composition has at least 0.01% solubility in 20° C. water Signed and Sealed this
Sixth Day of August, 2024

Katherine Kelly Vidal
*Director of the United States Patent and Trademark Office*